US011226707B2

(12) United States Patent
 Yu et al.

(10) Patent No.: US 11,226,707 B2
(45) Date of Patent: Jan. 18, 2022

(54) TOUCH SCREEN PANEL

(71) Applicant: TPK Advanced Solutions Inc., Fujian (CN)

(72) Inventors: Chien Hsien Yu, Zhubei (TW); Chien Min Lai, New Taipei (TW); Chin Hsueh Fang, Xiamen (CN)

(73) Assignee: TPK Advanced Solutions Inc., Xiamen (CN)

( * ) Notice: Subject to any disclaimer, the term of this patent is extended or adjusted under 35 U.S.C. 154(b) by 0 days.

(21) Appl. No.: 17/091,123

(22) Filed: Nov. 6, 2020

(65) Prior Publication Data
US 2021/0397303 A1    Dec. 23, 2021

(30) Foreign Application Priority Data

Jun. 23, 2020    (CN) .......................... 202010578737.7

(51) Int. Cl.
*G06F 3/041*    (2006.01)
*G06F 3/044*    (2006.01)

(52) U.S. Cl.
CPC .. *G06F 3/0445* (2019.05); *G06F 2203/04112* (2013.01)

(58) Field of Classification Search
CPC ................... G06F 3/0445; G06F 2203/04112
USPC ....................................................... 345/173
See application file for complete search history.

(56) References Cited

U.S. PATENT DOCUMENTS

| 10,572,091 | B2 | 2/2020 | Xie et al. |
| 2019/0384429 | A1 | 12/2019 | Hsiao et al. |
| 2020/0019280 | A1 | 1/2020 | Chen et al. |
| 2020/0057529 | A1 | 2/2020 | Zhang |
| 2020/0201507 | A1* | 6/2020 | Liu ........................ G06F 3/0446 |

FOREIGN PATENT DOCUMENTS

| CN | 108958561 A | 12/2018 |
| CN | 110045887 A | 7/2019 |
| TW | 201723768 A | 7/2017 |
| TW | M604002 U | 11/2020 |

* cited by examiner

*Primary Examiner* — Deeprose Subedi
(74) *Attorney, Agent, or Firm* — Cooper Legal Group, LLC

(57) ABSTRACT

A touch screen panel is provided, which includes a plurality of first electrodes, a plurality of first etched lines, a plurality of second electrodes, and a plurality of second etched lines. The first electrodes are formed along a first direction and separated by the first etched lines. The second electrodes are formed along a second direction and separated by the second etched lines. A largest width of the first and second etched lines is C, and each of a plurality of overlapping regions formed by projecting the first and second etched lines in a third direction have an area less than or equal to C squared. The first, second, and third directions are perpendicular to each other.

26 Claims, 15 Drawing Sheets

TOUCH SCREEN PANEL

CROSS-REFERENCE TO RELATED APPLICATION

This application claims priority to China Application Serial Number 202010578737.7, filed on Jun. 23, 2020, which is herein incorporated by reference.

BACKGROUND

Field of Disclosure

The present disclosure relates to a touch screen panel, and more particularly to a touch screen panel with a dummy pattern.

Description of Related Art

In recent years, with technological development of touch devices, the touch devices have been widely used in various electronic devices. A touch screen is widely used as a substitute for input devices such as a mouse or a keyboard, and the touch screen helps to directly input information on the screen using a finger or a pen.

In the prior art, in touch screen panels have a dummy pattern, in a top view, an etched region in which two layers of electrode patterns do not overlap will produce color differences between the two adjacent layers of electrode patterns, which will make the patterns overall visually obvious and easy to see. Even if a small block of the dummy pattern is added to non-electrode regions of each electrode layer, the obviousness issue in the etched region between the two electrode patterns cannot be solved.

Therefore, the existing technology really needs to be improved with respect to how to make the electrode patterns difficult to see.

SUMMARY

An object of one embodiment of the present disclosure is to provide a touch screen panel that significantly reduces visibility of electrode patterns through the design of dummy patterns.

One embodiment of the present disclosure provides a touch panel screen, which includes a plurality of first electrodes, a plurality of first etched lines, a plurality of second electrodes and a plurality of second etched lines. The first electrodes are disposed along a first direction. The first etched lines separate the first electrodes, so that the first electrodes are insulated from each other. The second electrodes are disposed along a second direction. The second etched lines separate the second electrodes, so that the second electrodes are insulated from each other. The second electrodes and the first electrodes are insulated from each other, the first direction is perpendicular to the second direction, and the second electrodes are arranged beneath the first electrodes. A largest width of the first etched lines and the second etched lines in a top view is C. Each of a plurality of overlapping regions formed by projecting the first etched lines and the second etched lines in a third direction have an area less than or equal to C squared. The third direction is perpendicular to the first direction and the second direction. C is in a range of from 0.01 mm to 0.1 mm.

In some embodiments, the overlapping regions are rectangular or square-shaped.

In some embodiments, the first etched lines near the overlapping regions are enclosed to define a concave shape, a square shape, or a combination thereof.

In some embodiments, the second etched lines near the overlapping regions are enclosed to define a concave shape, a square shape, or a combination thereof.

In some embodiments, the first electrodes and the second electrodes have a fibrous conductive substance.

In some embodiments, the fibrous conductive substance is nano silver wire.

One embodiment of the present disclosure provides a first transparent conductive layer and a second transparent conductive layer. The first transparent conductive layer has a plurality of first etched lines on the first transparent conductive layer. The second transparent conductive layer has a plurality of second etched lines on the second transparent conductive layer. A largest width of the first etched lines and the second etched lines in a top view is a predetermined width. The first transparent conductive layer and the second transparent conductive layer are separated by an insulating layer. The insulating layer is, for example, an insulating substrate, an insulating polymer layer, or an insulating inorganic layer. Projections of the first etched lines and the second etched lines in a vertical direction have a plurality of overlapping regions, and an area of each of the overlapping regions is less than or equal to the predetermined width squared.

In some embodiments, the overlapping regions are rectangular or square-shaped.

In some embodiments, the first etched lines near the overlapping regions are enclosed to define a concave shape, a square shape, or a combination thereof.

In some embodiments, the second etched lines near the overlapping regions are enclosed to define a concave shape, a square shape, or a combination thereof.

In some embodiments, the first transparent conductive layer and the second transparent conductive layer have a fibrous conductive substance.

In some embodiments, the fibrous conductive substance is nano silver wire.

One embodiment of the present disclosure provides a touch panel screen, which includes a plurality of first electrodes, a plurality of first etched lines, a plurality of second electrodes and a plurality of second etched lines. The first electrodes are disposed along a first direction. The first etched lines separate the first electrodes, so that the first electrodes are insulated from each other. The second electrodes are disposed along a second direction. The second etched lines separate the second electrodes, so that the second electrodes are insulated from each other. The second electrodes and the first electrodes are insulated from each other, and the first direction is perpendicular to the second direction, and the second electrodes are arranged beneath the first electrodes. A largest width of the first etched lines and the second etched lines in a top view is C. The first etched lines are projected in a third direction to become a plurality of first projection etched lines, and the second etched lines are projected in the third direction to become a plurality of second projection etched lines, so that the first projection etched lines and the second projection etched lines are on a same plane. One of the first projection etched lines and one of the second projection etched lines that are parallel and closest to each other have a distanced therebetween, and $10C \leq d \leq 100C$, in which C is in a range of from 0.01 mm to 0.1 mm. The third direction is perpendicular to the first direction and the second direction.

In some embodiments, a plurality of overlapping regions is defined by the first projection etched lines and the second projection etched lines, and the overlapping regions are rectangular or square-shaped.

In some embodiments, a plurality of overlapping regions is defined by the first projection etched lines and the second projection etched lines, and the first projection etched lines near the overlapping regions are enclosed to define a concave shape, a square shape, or a combination thereof.

In some embodiments, a plurality of overlapping regions is defined by the first projection etched lines and the second projection etched lines, and the second projection etched lines near the overlapping regions are enclosed to define a concave shape, a square shape, or a combination thereof.

In some embodiments, the first electrodes and the second electrodes have a fibrous conductive substance.

In some embodiments, the fibrous conductive substance is nano silver wire.

One embodiment of the present disclosure provides a touch panel screen, which includes a plurality of first electrodes, a plurality of first etched lines, a plurality of second electrodes and a plurality of second etched lines. The first electrodes are disposed along a first direction. The first etched lines separate the first electrodes, so that the first electrodes are insulated from each other. The second electrodes are disposed along a second direction. The second etched lines separate the second electrodes, so that the second electrodes are insulated from each other. The second electrodes and the first electrodes are insulated from each other, the first direction is perpendicular to the second direction, and the second electrodes are arranged beneath the first electrodes. A largest width of the first etched lines and the second etched lines in a top view is C. The first etched lines are projected in a third direction to become a plurality of first projection etched lines, and the second etched lines are projected in the third direction to become a plurality of second projection etched lines, so that the first projection etched lines and the second projection etched lines are on a same plane. The third direction is perpendicular to the first direction and the second direction. A plurality of overlapping regions is defined by the first projection etched lines and the second projection etched lines. The first etched lines near the overlapping regions define a plurality of first enclosed regions each having an area less than or equal to 2C squared, the second etched lines near the overlapping regions define a plurality of second enclosed regions each having an area less than or equal to 2C squared, in which C is in a range of from 0.01 mm to 0.1 mm. Each of the first enclosed regions has a first etched line segment, one end of the first etched line segment is located at one side of the first enclosed region away from the second enclosed region, and the other end of the first etched line segment is a free end that is not overlapped with any of the second enclosed regions. Each of the second enclosed regions has a second etched line segment, one end of the second etched line segment is located at one side of the second enclosed region away from the first enclosed region, and the other end of the second etched line segment is a free end that is not overlapped with any of the first enclosed regions.

In some embodiments, the first etched line segment is perpendicular to the side of the first enclosed region away from the second enclosed region.

In some embodiments, the second etched line segment is perpendicular to the side of the second enclosed region away from the first enclosed region.

In some embodiments, the overlapping regions are rectangular or square-shaped.

In some embodiments, the first projection etched lines near the overlapping regions are enclosed to define a concave shape.

In some embodiments, the second projection etched lines near the overlapping regions are enclosed to define a concave shape.

In some embodiments, the first electrodes and the second electrodes have a fibrous conductive substance.

In some embodiments, the fibrous conductive substance is nano silver wire.

BRIEF DESCRIPTION OF THE DRAWINGS

Various aspects of the present disclosure will be most easily understood when the following detailed description is read in conjunction with the accompanying drawings. It should be noted that according to industry standard operating procedures, various characteristic structures may not be drawn to scale. In fact, for clarity of discussion, the size of various characteristic structures can be arbitrarily increased or decreased.

DETAILED DESCRIPTION

In order that the present disclosure is described in detail and completeness, implementation aspects and specific embodiments of the present disclosure with illustrative description are presented, but it is not the only form for implementation or use of the specific embodiments of the present disclosure. The embodiments disclosed herein may be combined or substituted with each other in an advantageous manner, and other embodiments may be added to an embodiment without further description. In the following description, numerous specific details will be described in detail in order to enable the reader to fully understand the following embodiments. However, the embodiments of the present disclosure may be practiced without these specific details.

In addition, spatially relative terms, such as "beneath," "over," and the like, may be used herein for ease of description to describe one element or feature's relationship to another element(s) or feature(s) as shown in the Figures. The spatially relative terms are intended to encompass different orientations of the device in use or operation in addition to the orientation depicted in the figures. The apparatus may be otherwise oriented (rotated 90 degrees or at other orientations), and the spatially relative descriptions used herein may likewise be interpreted accordingly.

As used herein, unless the context specifically dictates otherwise, "a" and "the" may mean a single or a plurality. It will be further understood that "comprise", "include", "have", and similar terms as used herein indicate features, regions, integers, steps, operations, elements and/or components stated herein, but not exclude additional features, regions, integers, steps, operations, elements and/or components.

A touch screen panel according to an embodiment of the present disclosure includes a first transparent conductive layer and a second transparent conductive layer. In another embodiment, the touch screen panel includes a first transparent conductive layer, a second transparent conductive layer, and an insulating layer disposed between the first transparent conductive layer and the second transparent conductive layer. The insulating layer is, for example, an insulating substrate (such as the first substrate 100 in FIG. 1), an insulating polymer layer, or an insulating inorganic layer.

Figure 1:
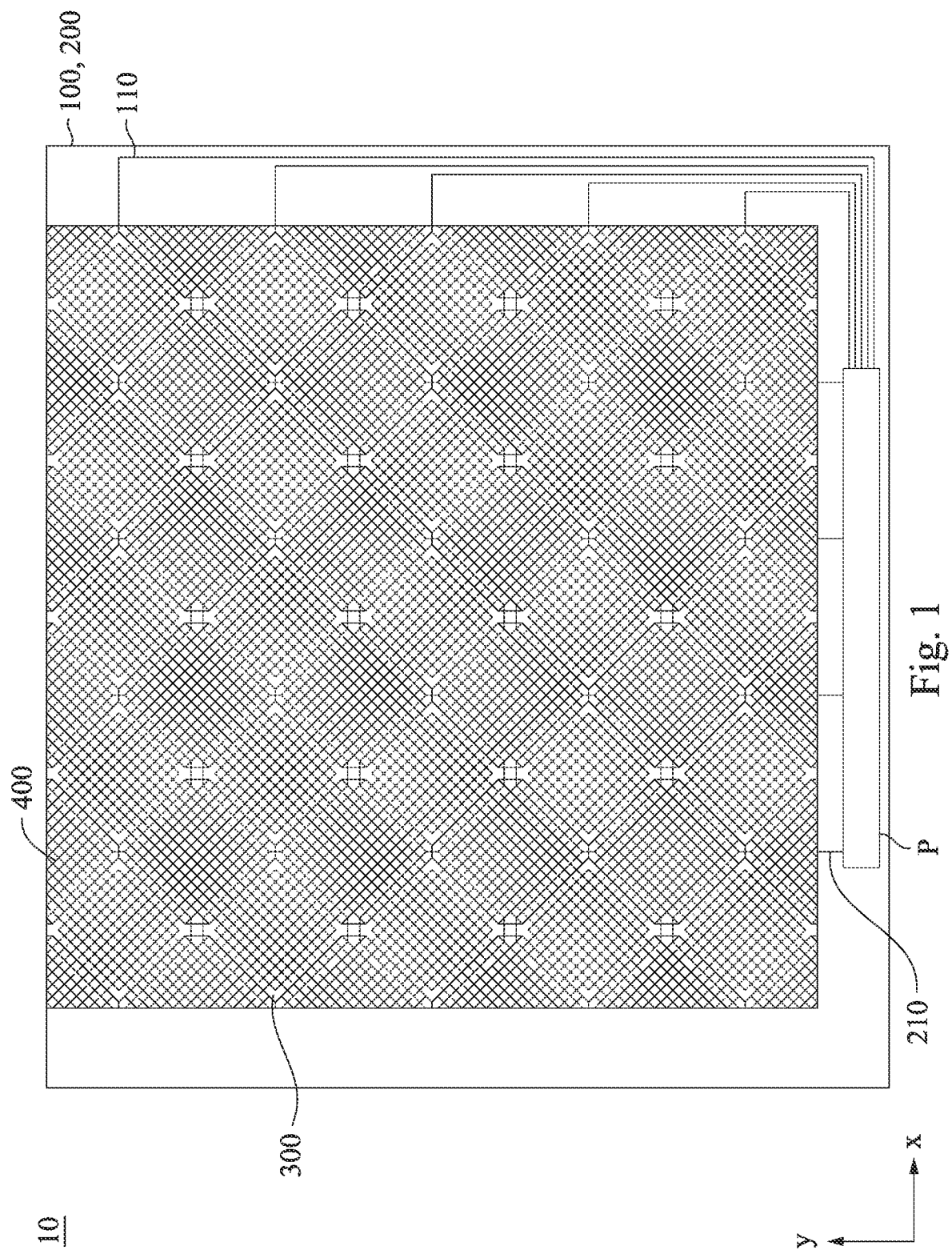
FIG. 1 is a schematic top view of a touch screen panel according to an embodiment of the present disclosure.

Please refer to FIG. 1, which is a schematic top view of a touch screen panel according to an embodiment of the present disclosure. The touch screen panel 10 includes a first substrate 100, a second substrate 200, a first transparent conductive layer 300, and a second transparent conductive layer 400.

The first transparent conductive layer 300 and a plurality of first leads 110 are provided on the first substrate 100. The first substrate 100 is made of a transparent flexible insulating material, such as general resins such as polyethylene terephthalate and acrylic resins, general engineering resins such as polyacetal resins and polycarbonate resins, polysulfone resins, polyphenylene sulfide resins or a combination thereof. The first substrate 100 has a thickness in a range of from, for example, 25 μm to 100 μm. The first leads 110 are connected to the first transparent conductive layer 300. The first leads 110 include a conductive ink as the main body, and the conductive ink includes an ink including conductive particles such as metals such as gold, silver, copper, nickel, and palladium, or carbon.

The second substrate 200 is disposed beneath the first substrate 100, and the second transparent conductive layer 400 and a plurality of second leads 210 are provided on the second substrate 200. The second substrate 200 is made of a transparent flexible insulating material, such as general resins such as polyethylene terephthalate and acrylic resins, general engineering resins such as polyacetal resins and polycarbonate resins, polysulfone resins, polyphenylene sulfide resins or a combination thereof. The second substrate 200 has a thickness in a range of from, for example, 25 μm to 100 μm. The second leads 210 are connected to the second transparent conductive layer 400. The second leads 210 include a conductive ink as the main body, and the conductive ink includes an ink including conductive particles such as metals such as gold, silver, copper, nickel, and palladium, or carbon. The ends of the first leads 110 opposite to the first transparent conductive layer 300 and the ends of the second leads 210 opposite to the second transparent conductive layer 400 are connected to an external connection terminal P.

Figure 2:
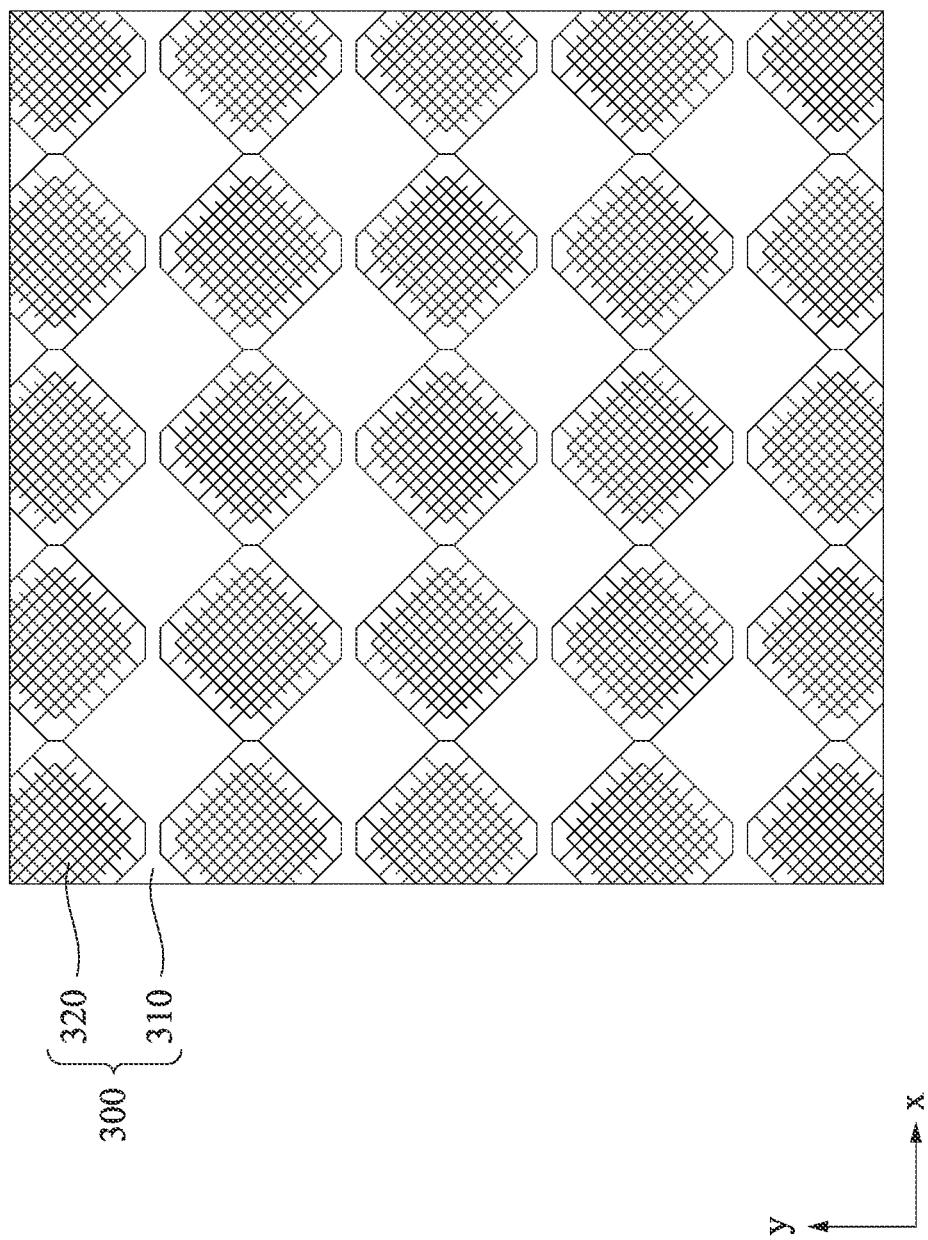
FIG. 2 is a schematic diagram of a first transparent conductive layer according to an embodiment of the present disclosure.

Please refer to FIG. 2, which is a schematic diagram of a first transparent conductive layer according to an embodiment of the present disclosure. The first transparent conductive layer 300 includes a plurality of first electrodes 310 and a plurality of first etched lines 320. The first electrodes 310 are formed along a first direction, for example, the X-axis direction. The first etched lines 320 separate the first electrodes 310, so that the first electrodes 310 are insulated from each other. In some embodiments, the first electrodes 310 have a fibrous conductive substance, such as nano silver wire.

Figure 3:
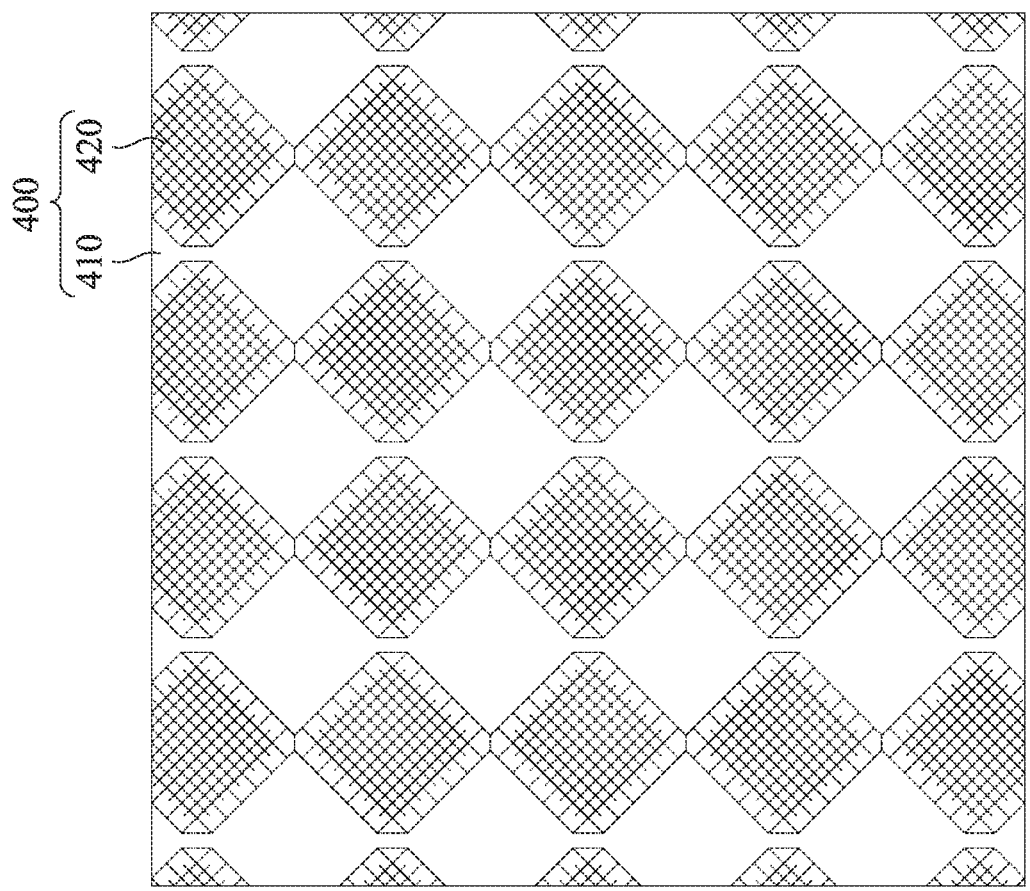
FIG. 3 is a schematic diagram of a second transparent conductive layer according to an embodiment of the present disclosure.
Figure 3:
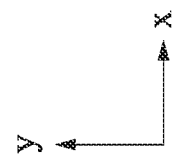

Please refer to FIG. 3, which is a schematic diagram of a second transparent conductive layer according to an embodiment of the present disclosure. The second transparent conductive layer 400 includes a plurality of second electrodes 410 and a plurality of second etched lines 420. The second electrodes 410 are formed along a second direction, for example, the Y-axis direction. The second etched lines 420 separate the second electrodes 410, so that the second electrodes 410 are insulated from each other. In some embodiments, the second electrodes have a fibrous conductive substance, such as nano silver wire.

Figure 4:
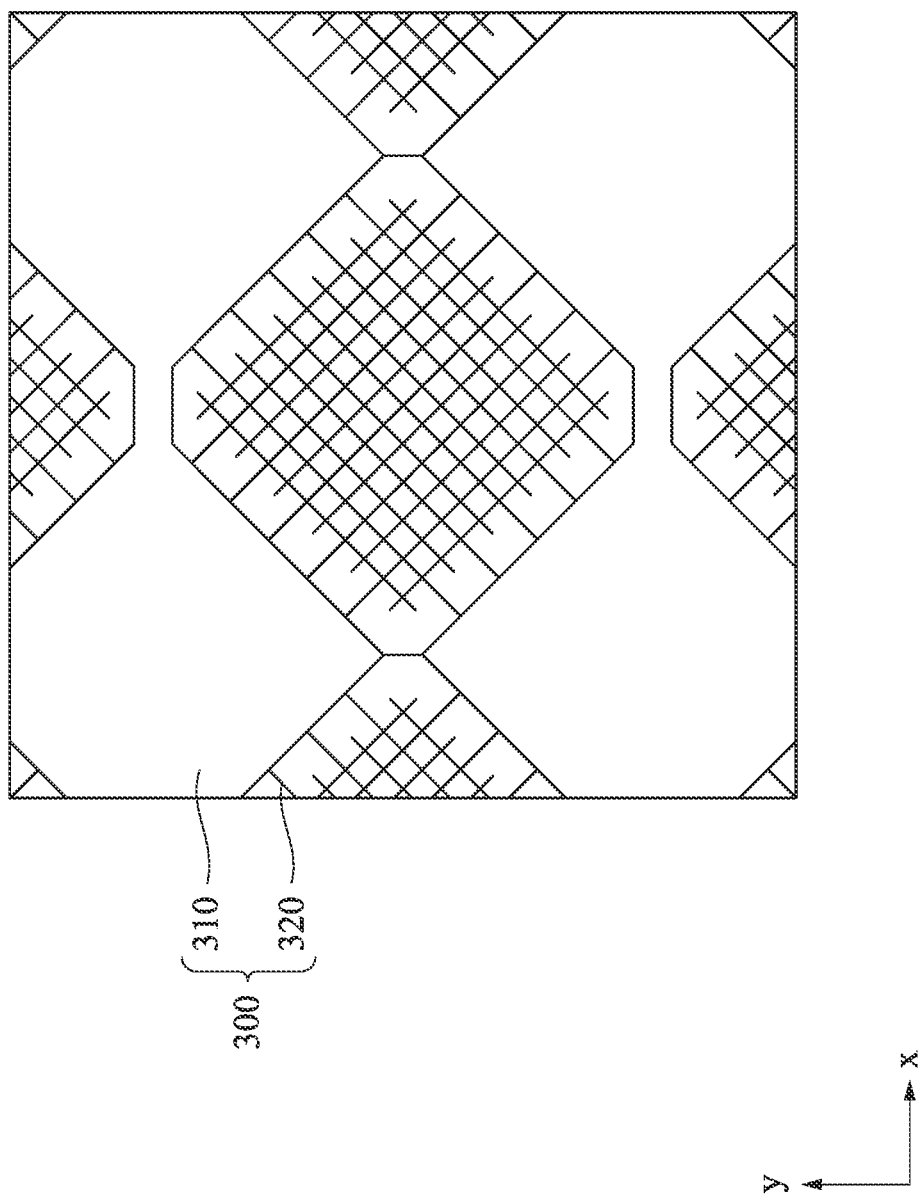
FIG. 4 is an enlarged schematic view of a first electrode according to an embodiment of the present disclosure.
Figure 5:
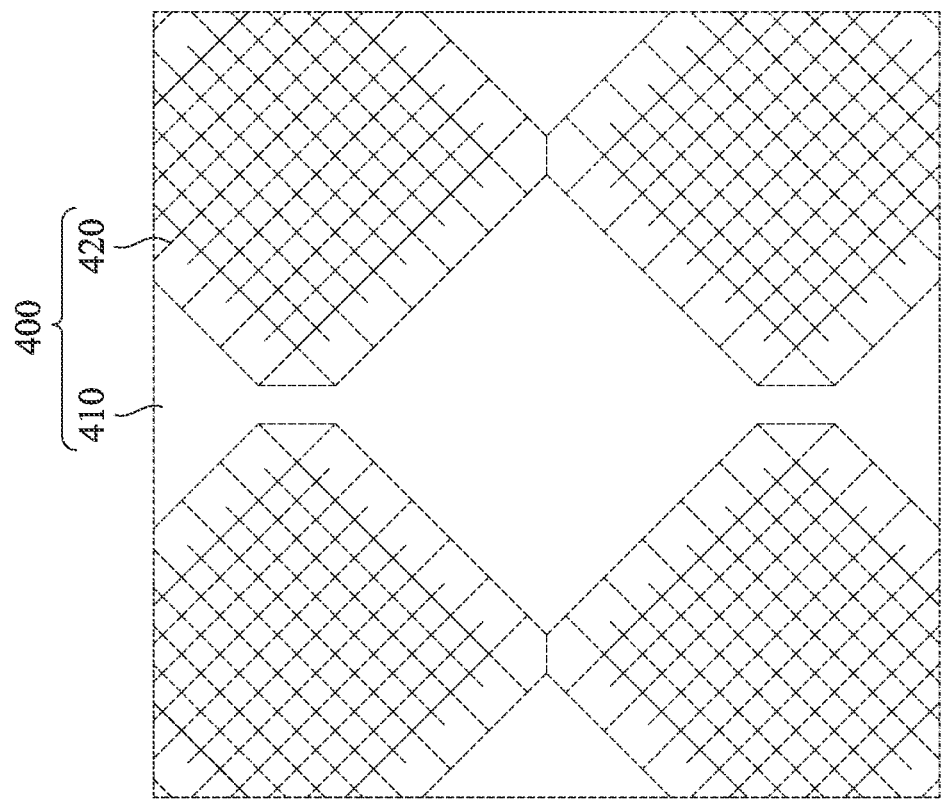
FIG. 5 is an enlarged schematic view of a second electrode according to an embodiment of the present disclosure.
Figure 5:
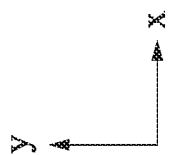
Figure 6:
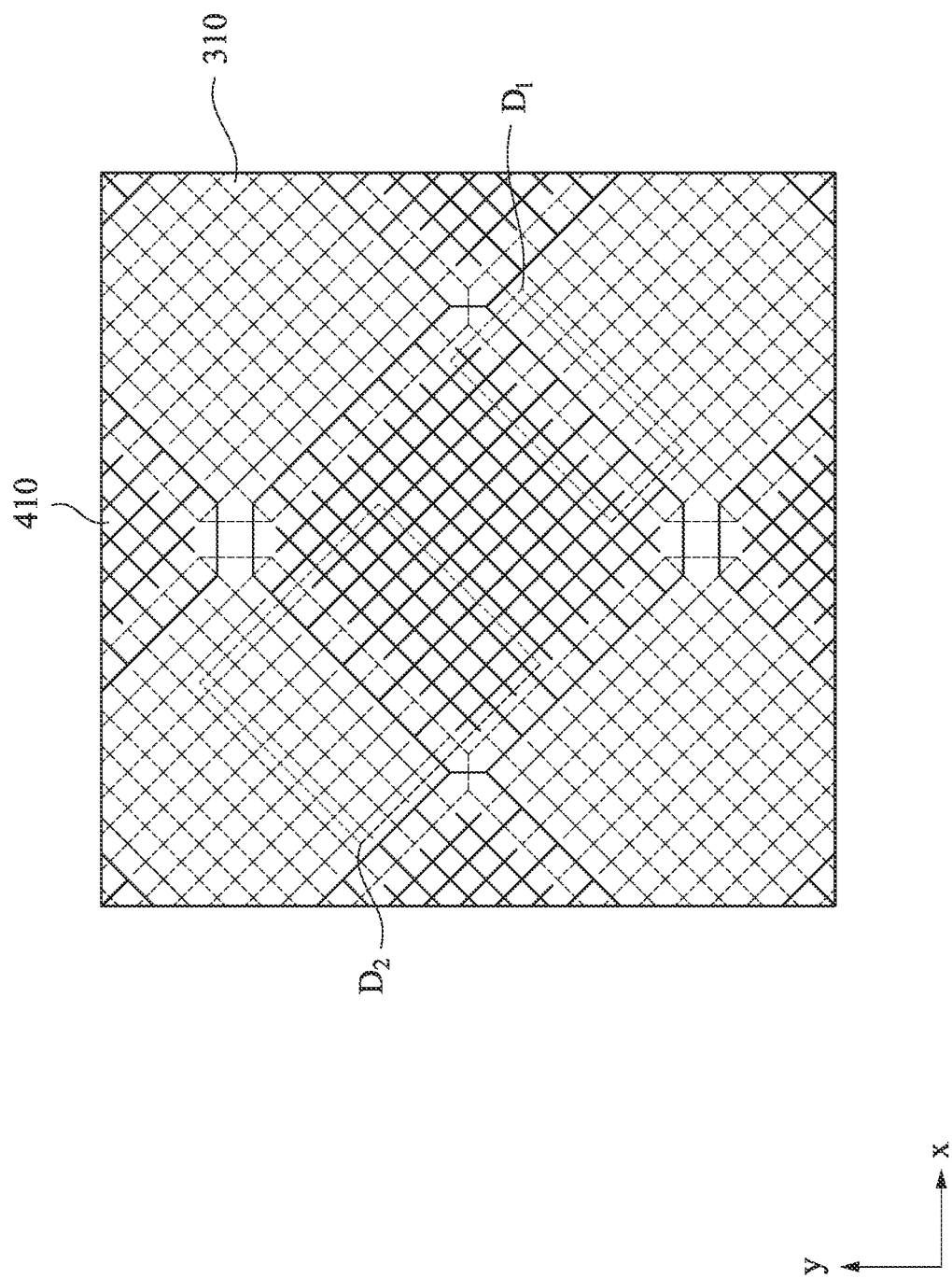
FIG. 6 is an enlarged schematic view of a first electrode and a second electrode in an overlapped top view according to an embodiment of the present disclosure.

Please refer to FIGS. 4 to 6. FIG. 4 is an enlarged schematic view of a first electrode according to an embodiment of the present disclosure, FIG. 5 is an enlarged schematic view of a second electrode according to an embodiment of the present disclosure, and FIG. 6 is an enlarged schematic view of a first electrode and a second electrode in an overlapped top view according to an embodiment of the present disclosure. The second electrodes 410 and the first electrodes 310 are insulated from each other, the first direction is perpendicular to the second direction, and the second electrodes 410 (dashed layer) are arranged beneath the first electrodes 310 (solid line layer).

Figure 7:
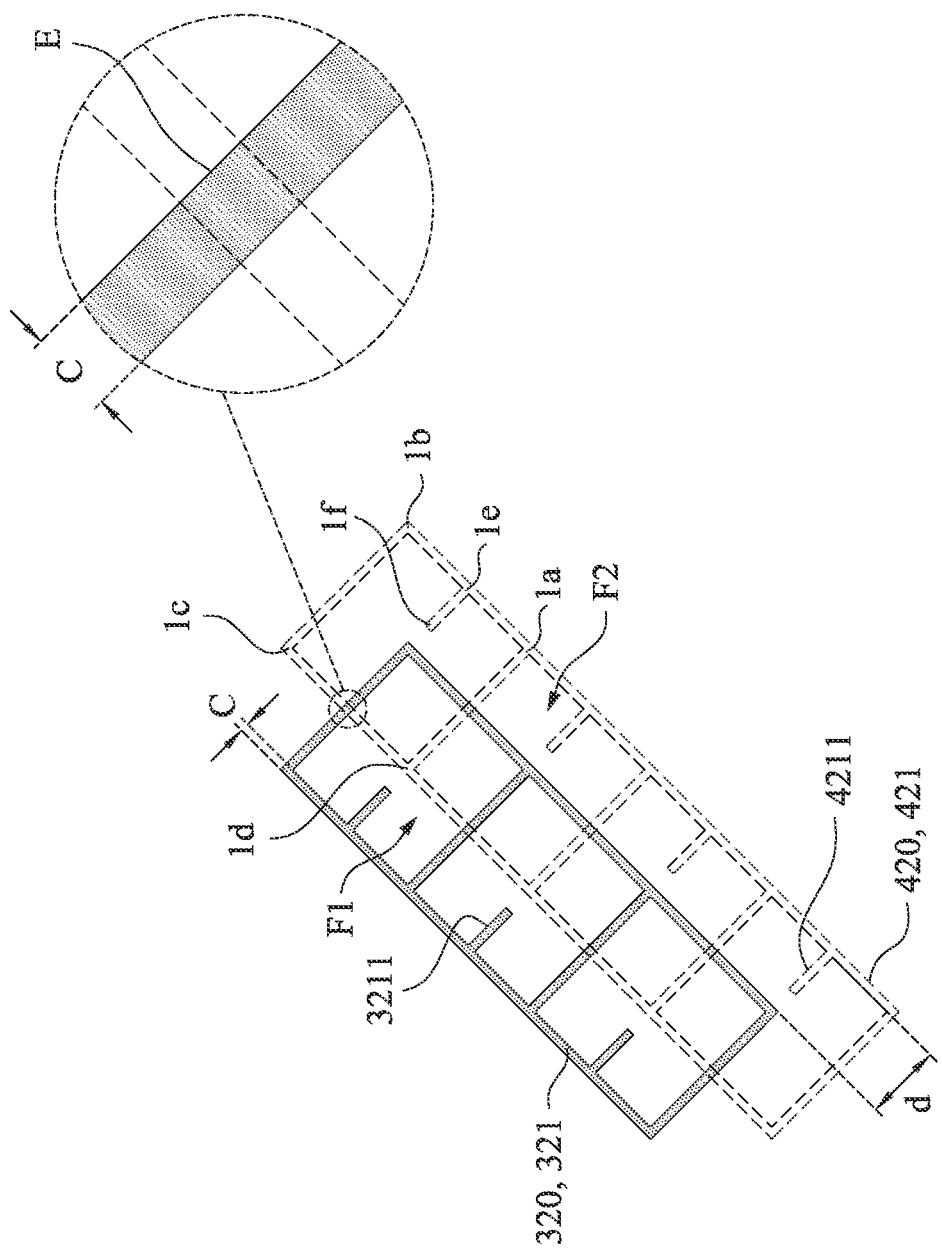
FIG. 7 is a partially enlarged schematic view of an overlapping portion $D_1$ between the first electrode and the second electrode of FIG. 6.

Please refer to FIG. 7, which is a partially enlarged schematic view of an overlapping portion $D_1$ between the first electrodes 310 and the second electrodes 410 of FIG. 6. A largest width of the first etched lines 320 and the second etched lines 420 is C; in an embodiment, the width C is in a range of from 0.01 mm to 0.1 mm, such as 0.02 mm. A plurality of overlapping regions E formed by projecting the first etched lines 320 and the second etched lines 420 in a third direction have an area less than or equal to C squared (as shown in the enlarged view at the upper right of FIG. 7). The third direction is perpendicular to the first direction and the second direction. For example, the first direction is the X-axis direction, the second direction is the Y-axis direction, and the third direction is the Z-axis direction. In some embodiments, the overlapping regions E are square-shaped. In some embodiments, the first etched lines 320 near the overlapping regions E are enclosed to form a concave shape. In some embodiments, the second etched lines 420 near the overlapping regions E are enclosed to form a concave shape.

In one embodiment, the first etched lines 320 are projected in a third direction to become a plurality of first projection etched lines 321, and the second etched lines 420 are projected in the third direction to become a plurality of second projection etched lines 421, so that the first projection etched lines 321 and the second projection etched lines 421 are on a same plane. One of the first projection etched lines 321 and one of the second projection etched lines 421 that are parallel and closest to each other have a distance d therebetween, and $10C \leq d \leq 100C$. In one embodiment, the distance d is in a range of from 0.1 mm to 1 mm, such as 0.5 mm. The third direction is perpendicular to the first direction and the second direction. For example, the first direction is the X-axis direction, the second direction is the Y-axis direction, and the third direction is the Z-axis direction.

In one embodiment, the first etched lines 320 near the overlapping regions E are enclosed to form a plurality of first enclosed regions F1, and an area defined by each of the first enclosed regions F1 is less than or equal to 2C squared. The second etched lines 420 near the overlapping regions E are enclosed to form a plurality of second enclosed regions F2, and an area defined by each of the second enclosed regions F2 is less than or equal to 2C squared. Each of the first enclosed regions F1 has a first etched line segment 3211. One of the first etched line segment 3211 is located at one side of the first enclosed region F1 away from the second enclosed region F2, and the other end of the first etched line segment 3211 is a free end that is not overlapped with the second enclosed region F2. Each second enclosed regions F2 has a second etched line segment 4211. One end of the second etched line segment 4211 is located at one side of the second enclosed region F2 away from the first enclosed region F1, and the other end of the second etched line segment 4211 is a free end that is not overlapped with the first enclosed region F1.

Specifically, for example, the second etched lines 420 with points $1a$, $1b$, $1c$, $1d$, $1e$, and $1f$ are enclosed to form the second enclosed region F2, and there is no other geometric shape composed of the enclosed line segments in the second enclosed region F2. There is an etched line segment extending from point $1e$ to point $1f$ (i.e., the second etched line segment 4211) in the second enclosed region F2, and no other etched lines exist. The etched line segment extending from point $1e$ to point $1f$ intersects with one of the second etched lines 420 constituting the second enclosed region F2, and one end of the etched line segment $1e1f$ is a free end, which is not connected to other etched lines. For example, the etched line extending from point $1e$ to point $1f$ intersects with the etched line extending from point $1a$ to point $1b$, and the point $1f$ of the etched line segment extending from point $1e$ to point $1f$ is the free end. In addition, in a vertical projection direction, the etched line segment extending from point $1e$ to point $1f$ does not overlap with the etched line of another layer of electrodes. For example, the etched line segment extending from point $1e$ to point $1f$ does not overlap with the first etched lines 320, first projection etched lines 321, or the first etched line segment 3211

Figure 8:
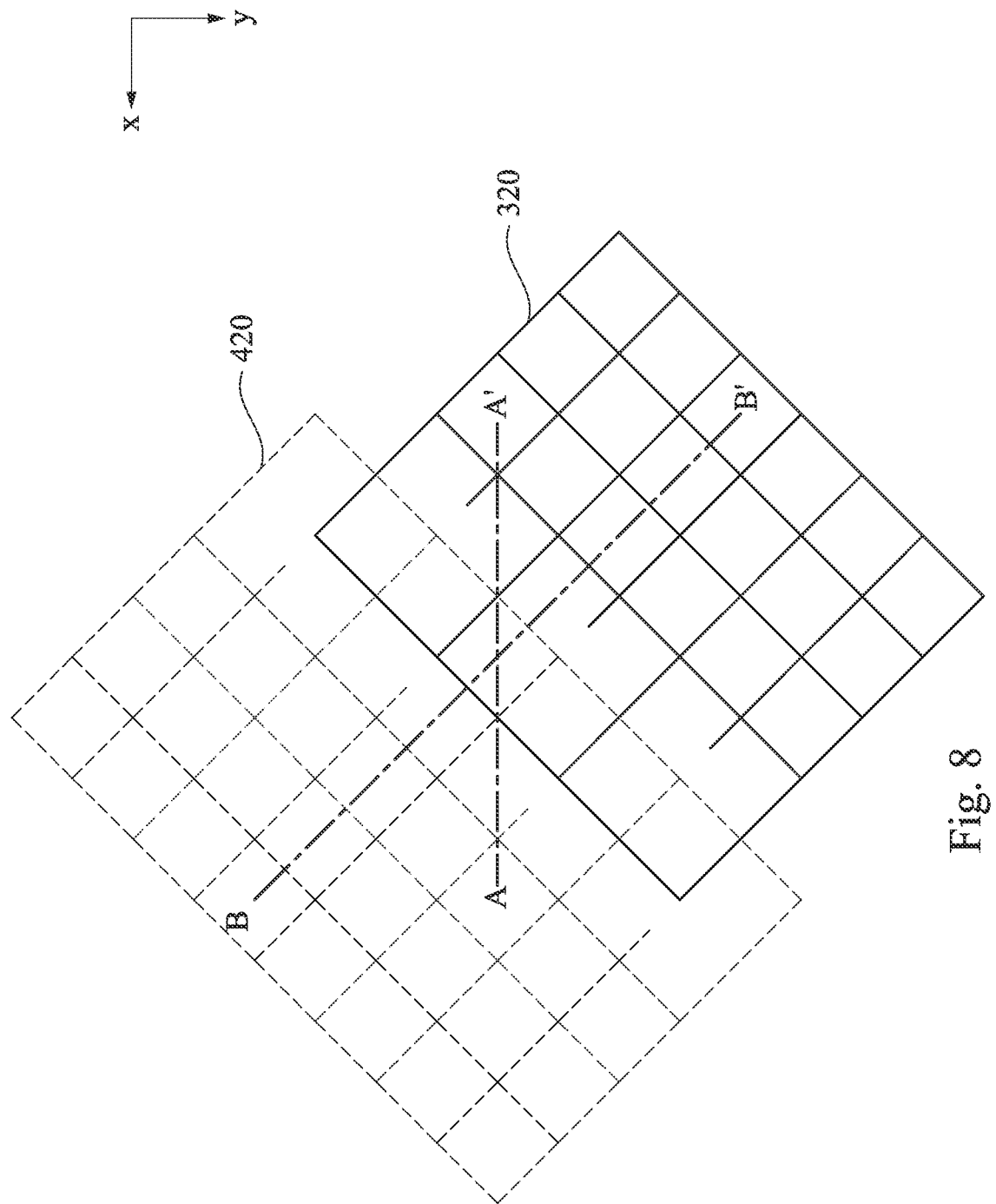
FIG. 8 is a partially enlarged schematic view of an overlapping portion $D_2$ between the first electrode and the second electrode of FIG. 6.
Figure 9:
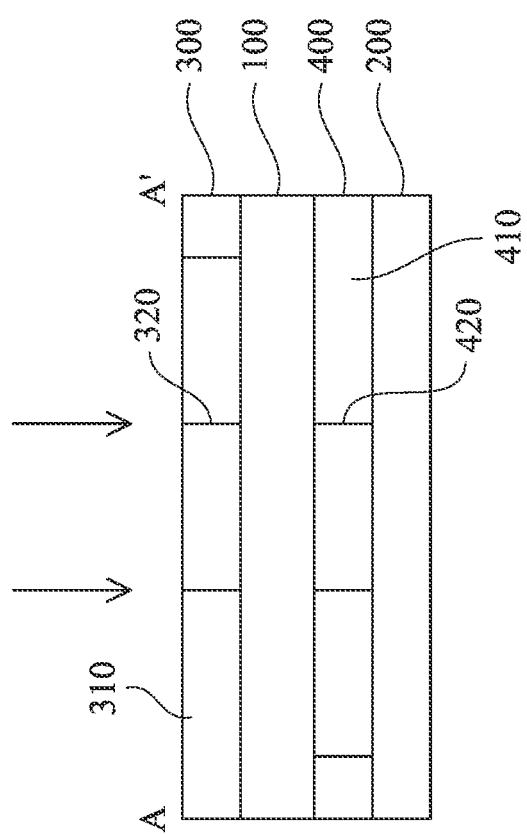
FIG. 9 is a cross-sectional view of FIG. 8 taken along the line A-A'.
Figure 10:
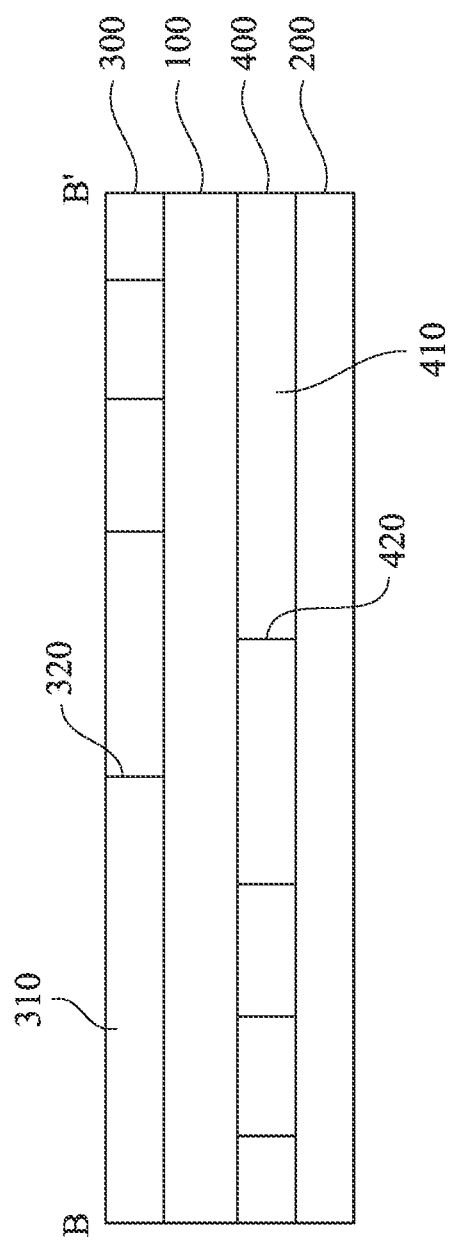
FIG. 10 is a cross-sectional view of FIG. 8 taken along the line B-B'.

Please refer to FIGS. 8-9, in which FIG. 8 is a partially enlarged schematic view of an overlapping portion $D_2$ between the first electrode and the second electrode of FIG. 6 and FIG. 9 is a cross-sectional view of FIG. 8 taken along the line A-A'. In a top view of FIG. 9, four layers are present from top to bottom. A left side of the first layer is the region of the first electrode 310 of the first transparent conductive layer 300, and a vertical line segment of the first layer is the first etched line 320. The second layer is the first substrate 100. A right side of the third layer is the region of the second electrode 410, and a vertical line segment of the third layer is the second etched line 420. The fourth layer is the second substrate 200. The position where the first etched line 320 and the second etched line 420 are aligned is the position where the first etched line 320 and the second etched line 420 are overlapped in FIG. 8. Please refer to FIG. 10, which is a cross-sectional view of FIG. 8 taken along the line B-B'. In a top view of FIG. 10, similar to FIG. 9, four layers are present from top to bottom. A left side of the first layer is the region of the first electrode 310 of the first transparent conductive layer 300, and a vertical line segment of the first layer is the first etched line 320. The second layer is the first substrate 100. A right side of the third layer is the region of the second electrode 410, and a vertical line segment of the third layer is the second etched line 420. The fourth layer is the second substrate 200. The first etched line 320 and the second etched line 420 are staggered in the middle. It can also be seen that when viewed from above, the distances of all the etched lines are approximately equal.

Figure 11:
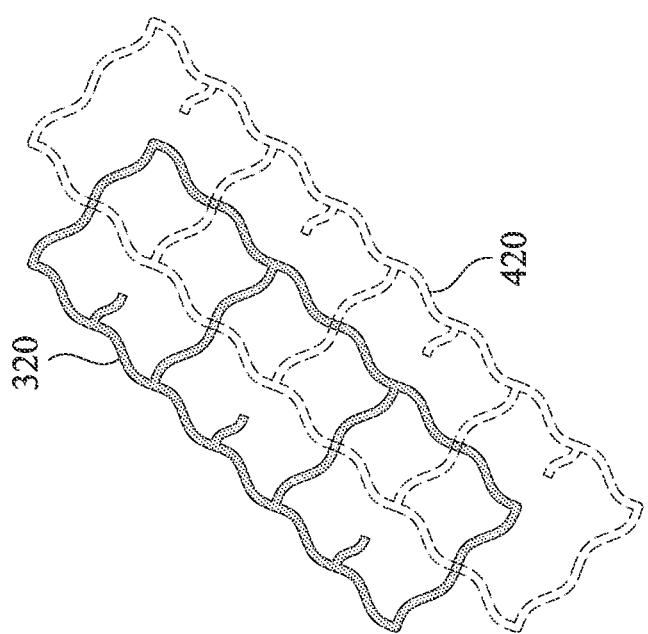
FIG. 11 is an enlarged schematic view of a first electrode and a second electrode in an overlapped top view according to another embodiment of the present disclosure.

In another embodiment of the present disclosure, as shown in FIG. 11, which is an enlarged schematic view of a first electrode and a second electrode in an overlapped top view, the graphic design is similar to FIG. 7 except that all the etched lines are presented in a wavy shape or S-shape.

Figure 12:
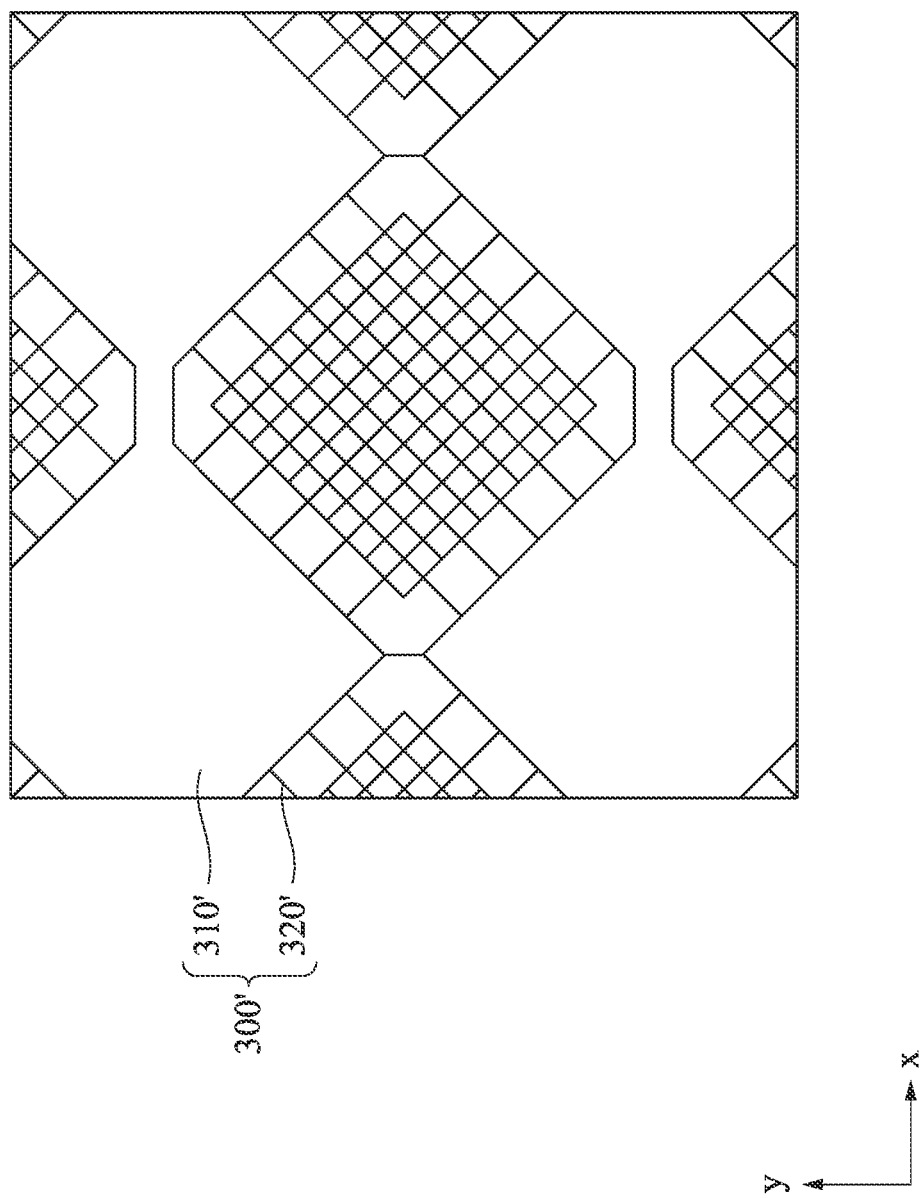
FIG. 12 is an enlarged schematic view of a first electrode according to another embodiment of the present disclosure.
Figure 13:
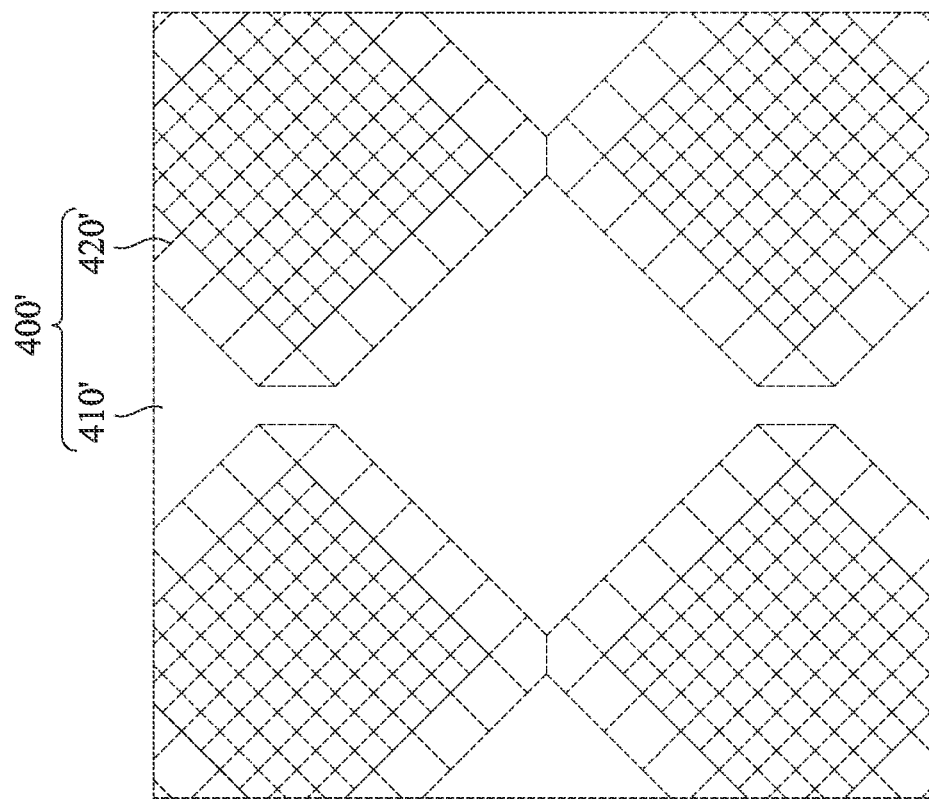
FIG. 13 is an enlarged schematic view of a second electrode according to another embodiment of the present disclosure.
Figure 14:
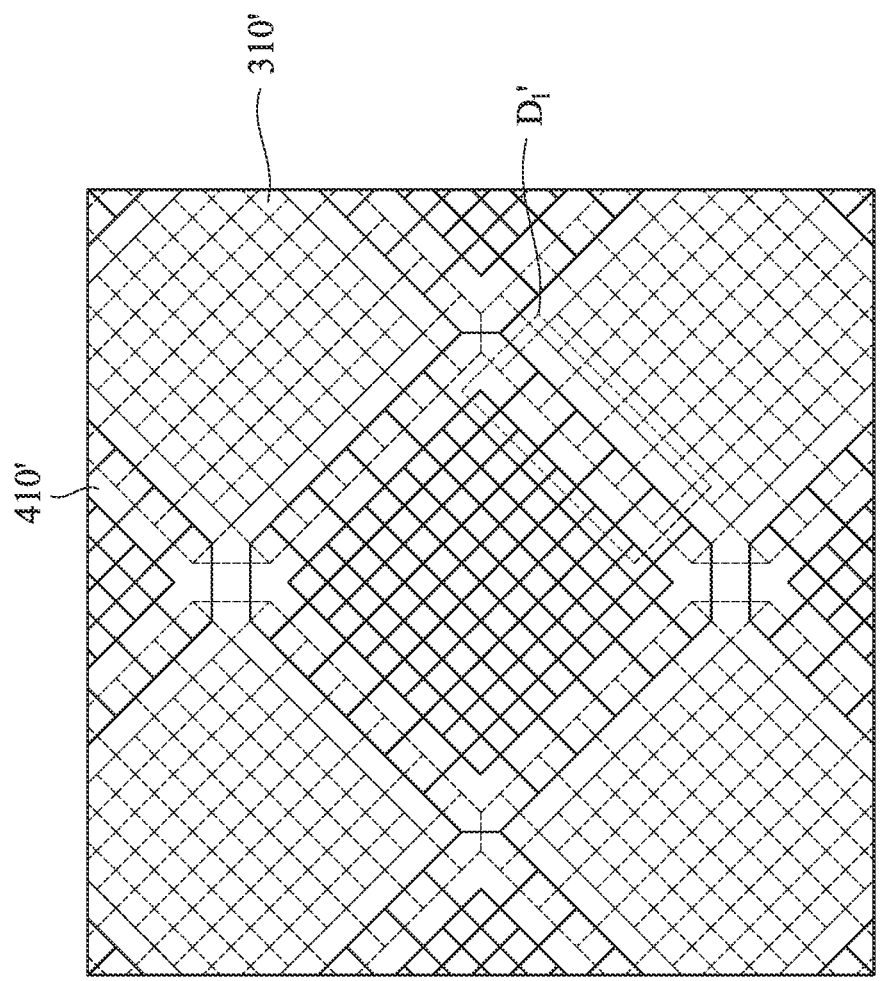
FIG. 14 is an enlarged schematic view of a first electrode and a second electrode in an overlapped top view according to another embodiment of the present disclosure.

Another embodiment of the present disclosure is shown in FIGS. 12 to 14. FIG. 12 is an enlarged schematic view of a first electrode according to another embodiment of the present disclosure. FIG. 13 is an enlarged schematic view of a second electrode according to another embodiment of the present disclosure. FIG. 14 is an enlarged schematic view of a first electrode and a second electrode in an overlapped top view according to another embodiment of the present disclosure. A first transparent conductive layer 300' of the touch screen panel includes a plurality of first electrodes 310' and a plurality of first etched lines 320', and a second transparent conductive layer 400' includes a plurality of second electrodes 410' and a plurality of second etched lines 420'. The second electrodes 410' and the first electrodes 310' are insulated from each other, the first direction is perpendicular to the second direction, and the second electrodes 410' (dashed layer) are arranged beneath the first electrodes 310' (solid line layer).

Figure 15:
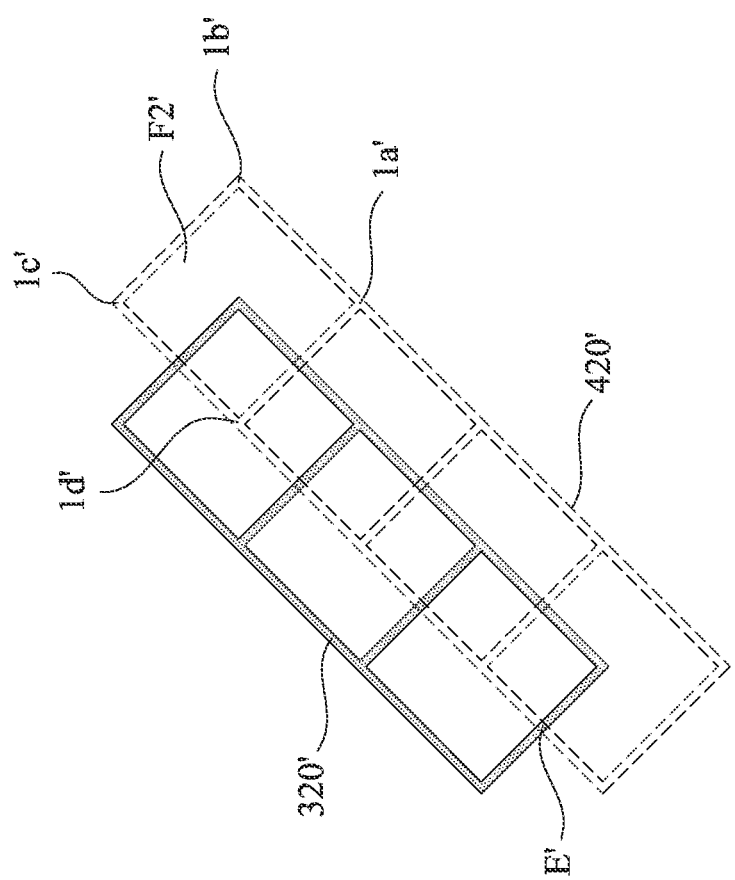
FIG. 15 is a partially enlarged schematic view of an overlapping portion $D_3$ between the first electrode and the second electrode of FIG. 14.

Please refer to FIG. 15, which is a partially enlarged schematic view of an overlapping portion $D_1$' between the first electrode 310' and the second electrode 410' of FIG. 14. The difference between the embodiment of FIG. 15 and that of FIG. 7 is that first etched lines 320' near overlapping regions E' are enclosed to form a square shape. In some embodiments, second etched lines 420' near the overlapping regions E' are enclosed to form a square shape. Specifically, for example, the second etched lines 420' extending between points $1a'$, $1b'$, $1c'$, and $1d'$ are enclosed to form a second enclosed region F2', and there is no other etched line segment in the second enclosed region F2'.

In various embodiments of the present disclosure, there is a largest width C among the first etched lines and the second etched lines, and a plurality of overlapping regions formed by projecting the first etched lines and the second etched lines in a third direction have an area less than or equal to the width squared of the first etched lines and the second etched lines. The above technical features will make the dummy patterns unobvious in the overall view of the two-layer electrodes to improve the obvious pattern issue due to the dense etched lines, so that the patterns are unobvious when viewed from a distance and visibility of the electrode patterns is significantly reduced.

Although the disclosure has been disclosed in the above embodiments, it is not intended to limit the disclosure, and it is to be understood that those skilled in the art can make various changes and modifications without departing from the spirit and scope of the disclosure. The scope of protection of the present disclosure is subject to the definition of the scope of claims.

What is claimed is:

1. A touch screen panel, comprising:
a plurality of first electrodes disposed along a first direction;
a plurality of first etched lines separating the first electrodes, so that the first electrodes are insulated from each other;
a plurality of second electrodes disposed along a second direction; and
a plurality of second etched lines separating the second electrodes, so that the second electrodes are insulated from each other,
wherein the second electrodes and the first electrodes are insulated from each other, the first direction is perpendicular to the second direction, and the second electrodes are arranged beneath the first electrodes,
wherein a largest width of the first etched lines and the second etched lines in a top view is C,
wherein each of a plurality of overlapping regions formed by projecting the first etched lines and the second etched lines in a third direction have an area less than or equal to C squared,
wherein the third direction is perpendicular to the first direction and the second direction, and
wherein C is in a range of from 0.01 mm to 0.1 mm.

2. The touch screen panel of claim 1, wherein the overlapping regions are rectangular or square-shaped.

3. The touch screen panel of claim 1, wherein the first etched lines near the overlapping regions are enclosed to define a concave shape, a square shape, or a combination thereof.

4. The touch screen panel of claim 1, wherein the second etched lines near the overlapping regions are enclosed to define a concave shape, a square shape, or a combination thereof.

5. The touch screen panel of claim 1, wherein the first electrodes and the second electrodes have a fibrous conductive substance.

6. The touch screen panel of claim 5, wherein the fibrous conductive substance is nano silver wire.

7. A touch screen panel, comprising:
a first transparent conductive layer with a plurality of first etched lines on the first transparent conductive layer; and
a second transparent conductive layer with a plurality of second etched lines on the second transparent conductive layer,
wherein a largest width of the first etched lines and the second etched lines in a top view is a predetermined width,
wherein the first transparent conductive layer and the second transparent conductive layer are separated by an insulating layer, and
wherein projections of the first etched lines and the second etched lines in a vertical direction have a plurality of overlapping regions, and an area of each of the overlapping regions is less than or equal to the predetermined width squared.

8. The touch screen panel of claim 7, wherein the overlapping regions are rectangular or square-shaped.

9. The touch screen panel of claim 7, wherein the first etched lines near the overlapping regions are enclosed to define a concave shape, a square shape, or a combination thereof.

10. The touch screen panel of claim 7, wherein the second etched lines near the overlapping regions are enclosed to define a concave shape, a square shape, or a combination thereof.

11. The touch screen panel of claim 7, wherein the first transparent conductive layer and the second transparent conductive layer have a fibrous conductive substance.

12. The touch screen panel of claim 11, wherein the fibrous conductive substance is nano silver wire.

13. A touch screen panel, comprising:
a plurality of first electrodes disposed along a first direction;
a plurality of first etched lines separating the first electrodes, so that the first electrodes are insulated from each other;
a plurality of second electrodes disposed along a second direction; and
a plurality of second etched lines separating the second electrodes, so that the second electrodes are insulated from each other,
wherein the second electrodes and the first electrodes are insulated from each other, the first direction is perpendicular to the second direction, and the second electrodes are arranged beneath the first electrodes,
wherein a largest width of the first etched lines and the second etched lines in a top view is C,
wherein the first etched lines are projected in a third direction to become a plurality of first projection etched lines, and the second etched lines are projected in the third direction to become a plurality of second projection etched lines, so that the first projection etched lines and the second projection etched lines are on a same plane,
wherein one of the first projection etched lines and one of the second projection etched lines that are parallel and closest to each other have a distance d therebetween, and $100 \leq d \leq 100C$, wherein C is in a range of from 0.01 mm to 0.1 mm, and
wherein the third direction is perpendicular to the first direction and the second direction.

14. The touch screen panel of claim 13, wherein a plurality of overlapping regions is defined by the first projection etched lines and the second projection etched lines, and wherein the overlapping regions are rectangular or square-shaped.

15. The touch screen panel of claim 13, wherein a plurality of overlapping regions is defined by the first projection etched lines and the second projection etched lines, and wherein the first projection etched lines near the overlapping regions are enclosed to define a concave shape, a square shape, or a combination thereof.

16. The touch screen panel of claim 13, wherein a plurality of overlapping regions is defined by the first projection etched lines and the second projection etched lines, and wherein the second projection etched lines near the overlapping regions are enclosed to define a concave shape, a square shape, or a combination thereof.

17. The touch screen panel of claim 13, wherein the first electrodes and the second electrodes have a fibrous conductive substance.

18. The touch screen panel of claim 17, wherein the fibrous conductive substance is nano silver wire.

19. A touch screen panel, comprising:
a plurality of first electrodes disposed along a first direction;
a plurality of first etched lines separating the first electrodes, so that the first electrodes are insulated from each other;
a plurality of second electrodes disposed along a second direction; and
a plurality of second etched lines separating the second electrodes, so that the second electrodes are insulated from each other,
wherein the second electrodes and the first electrodes are insulated from each other, the first direction is perpendicular to the second direction, and the second electrodes are arranged beneath the first electrodes,
wherein a largest width of the first etched lines and the second etched lines in a top view is C,
wherein the first etched lines are projected in a third direction to become a plurality of first projection etched lines, and the second etched lines are projected in the third direction to become a plurality of second projection etched lines, so that the first projection etched lines and the second projection etched lines are on a same plane,
wherein the third direction is perpendicular to the first direction and the second direction,
wherein a plurality of overlapping regions is defined by the first projection etched lines and the second projection etched lines,
wherein the first projection etched lines near the overlapping regions define a plurality of first enclosed regions each having an area less than or equal to 2C squared, the second projection etched lines near the overlapping regions define a plurality of second enclosed regions each having an area less than or equal to 2C squared, and C is in a range of from 0.01 mm to 0.1 mm,
wherein each of the first enclosed regions has a first etched line segment, one end of the first etched line segment is located at one side of the first enclosed region away from the second enclosed region, and the other end of the first etched line segment is a free end that is not overlapped with any of the second enclosed regions, and
wherein each of the second enclosed regions has a second etched line segment, one end of the second etched line segment is located at one side of the second enclosed region away from the first enclosed region, and the other end of the second etched line segment is a free end that is not overlapped with any of the first enclosed regions.

20. The touch screen panel of claim 19, wherein the first etched line segment is perpendicular to the side of the first enclosed region away from the second enclosed region.

21. The touch screen panel of claim 19, wherein the second etched line segment is perpendicular to the side of the second enclosed region away from the first enclosed region.

22. The touch screen panel of claim 19, wherein the overlapping regions are rectangular or square-shaped.

23. The touch screen panel of claim 19, wherein the first projection etched lines near the overlapping regions are enclosed to define a concave shape.

24. The touch screen panel of claim 19, wherein the second projection etched lines near the overlapping regions are enclosed to define a concave shape.

25. The touch screen panel of claim 19, wherein the first electrodes and the second electrodes have a fibrous conductive substance.

26. The touch screen panel of claim 25, wherein the fibrous conductive substance is nano silver wire.

* * * * *